United States Patent [19]

Hijikata et al.

[11] Patent Number: 4,772,422

[45] Date of Patent: Sep. 20, 1988

[54] ELECTRICALLY CONDUCTIVE RESIN COMPOSITION

[75] Inventors: Kenji Hijikata, Mishima; Toshio Kanoe, Fuji, both of Japan

[73] Assignee: Polyplastics Co., Ltd., Japan

[21] Appl. No.: 933,412

[22] Filed: Nov. 21, 1986

[30] Foreign Application Priority Data

Dec. 2, 1985 [JP] Japan ................................ 60-271254

[51] Int. Cl.$^4$ .......................... H01B 1/24; C08L 67/04
[52] U.S. Cl. ..................................... 252/511; 252/503; 252/506; 524/495; 524/599; 524/601; 524/602; 524/605; 528/485; 528/490
[58] Field of Search ............... 524/495, 605, 599, 601, 524/602; 252/511; 528/485, 490

[56] References Cited

U.S. PATENT DOCUMENTS 4,489,190 12/1984 Froix ................................. 524/439
4,569,786 2/1986 Deguchi ............................. 252/503

*Primary Examiner*—Theodore E. Pertilla
*Attorney, Agent, or Firm*—Burns, Doane, Swecker & Mathis

[57] ABSTRACT

An electrically conductive resin composition comprises (1) a polymer of the thermotropic liquid crystals being capable of the anisotropic property in the molten state and (2) an electrically conductive carbon black. It is improved in the impact strength and can contain a large amount of carbon black.

21 Claims, No Drawings

ELECTRICALLY CONDUCTIVE RESIN COMPOSITION

The present invention relates to an electrically-conductive resin composition.

STATEMENT OR PRIOR ARTS

Recently it is a common practice to impart electrical conductivity to plastics per se from which are made plastics housing parts used in computers, office machines, sound machines, and household electric appliances. This practice is intended to prevent the parts from becoming charged due to contact and friction.

Electrical conductivity is imparted by incorporating plastics with electrically-conductive carbon black or other electrically-conductive fillers. To be more specific, this is accomplished by incorporating a thermoplastic resin with an electrically-conductive filler such as electrically-conductive carbon black, graphite, metallic powder, metallic flake, metallic fiber, carbon fiber, and metal-coated glass fiber.

This technique is suitable for mass production and is advantageous over the technique of imparting electrical conductivity by the surface treatment of plastics moldings. In addition, this technique is promising in view of the development of low-price electrically-conductive filler and the advance of compounding and molding techniques. Among electrically-conductive fillers, electrically-conductive carbon black is attracting attention because of its superior electrical properties.

Imparting electrical conductivity by the incorporation of electrically-conductive carbon black has some disadvantages. Where sufficient electrical conductivity is required, it is necessary to incorporate a large amount of carbon black, and this is impractical in the case of resins having a high melt viscosity. In fact, it is almost impossible to incorporate a large amount of carbon black into commonly used thermoplastic resins such as polyacetal, polystyrene, ABS, polycarbonate, modified PPO, polyurethane, polypropylene, polyvinyl chloride, PBT, and nylon. On the other hand, metal-based electrically-conductive filler inevitably increases the weight of the composition. This sacrifices the merit of using a light plastics product. For the coexistence of weight saving and high electrical conductivity, it is essential to incorporate a large amount of electrically conductive carbon black. Insufficient heat resistance is another problem involved in conventional electrically-conductive resin composition composed of a thermoplastic resin and electrically-conductive carbon black.

It is an object of the present invention to provide an electrically-conductive resin composition which contains a large amount of electrically-conductive filler, is usable over a broad temperature range, and has good moldability.

SUMMARY OF THE INVENTION

In order to achieve the above-mentioned object, the present inventors carried out a series of researches, which led to the finding that a superior electrically-conductive resin composition can be obtained from a melt-processable polymer which forms the anisotropic molten phase, as a binder resin, and electrically-conductive carbon black as a filler. This polymer is superior in moldability due to its low melt viscosity. The present invention was completed on the basis of this finding.

An electrically conductive resin composition of the invention comprises (1) a polymer of the thermotropic liquid crystals being capable of the anisotropic property in the molten state and (2) an electrically conductive carbon black. It is preferable that the composition comprises (1) 25 to 99.5 percent by weight of the polymer and (2) 0.5 to 75 percent by weight of the carbon black. A preferable polymer to use in the invention has an ester group to connect the repeated units with one to another.

The present invention relates to an electrically-conductive resin composition which comprises (1) a thermotropic liquid crystal polymer which exhibits anisotropy in its molten state, and (2) electrically-conductive carbon black.

The electrically-conductive carbon black used in this invention may be any commercially available electrically-conductive carbon black such as Ketjen Black EC (a product of Lion Akzo Co., Ltd.).

Preferred electrically-conductive carbon black has high structure, small particle diameters, high porosity, and large surface area.

The electrically-conductive carbon black is added in an amount of 0.5 to 75 wt% based on the total weight of the resin composition. With an amount less than 0.5 wt%, the resin composition does not have sufficient electrical conductivity; and carbon black in excess of 75 wt% cannot be incorporated into a resin. The preferred amount is 2 to 35 wt% for desired physical properties and easy mixing.

According to this invention, the above-mentioned electrically-conductive carbon black may be used in combination with an additional electrically-conductive filler. This filler is one which is commonly used for filler-filled electrically-conductive plastics. It is in the form of particles, flakes, or fibers. Examples of particulate fillers include graphite powder, silver powder, copper powder, nickel powder, stainless steel powder, tin oxide powder, copper-silver composite powder, nickel-silver composite powder, silver-coated glass beads, and carbon balloon. Example of flaky fillers include aluminum flake, stainless steel flake, brass flake, and nickel flake. Examples of fibrous fillers include carbon fiber, aluminum fiber, brass fiber, copper fiber, stainless steel fiber, aluminum rubber, metallized glass fiber, and carbon-coated glass fiber.

These electrically-conductive fillers may be used individually or in combination with one another. The electrically-conductive filler used in this invention is not limited to the above-mentioned examples. The filler is not specifically restricted in shape, particle size, length, diameter, etc. They may be properly selected according to the use. A fibrous filler is preferable, and a combination of electrically-conductive carbon black and carbon fiber is preferable.

For adequate moldability, the amount of the filler other than electrically-conductive carbon black should be less than 30 wt% (based on the total weight of the resin composition) in the case of fibrous fillers and less than 40 wt% in the case of other fillers.

The binder resin used in this invention is a polymer composition which exhibits the optical anisotropy in its molten state and is capable of melt-processing. It falls under a category of thermotropic liquid crystal polymer.

The polymer that forms the anisotropic molten phase has the property that the polymer chains are regularly oriented in parallel with one another when it is in the molten state. The state in which molecules are oriented as mentioned above is referred to as the liquid crystal state or the nematic phase of a liquid crystal. The polymer like this is usually produced from a monomer which has a thin, long, and flat configuration, has a high rigidity along the long axis of the molecule, and has a plurality of chain extension linkages which are axial or parallel with one another.

The properties of the anisotropic molten phase can be determined by an ordinary polarization test using crossed nicols. More particularly, the properties can be determined with a Leitz polarizing microscope of 40 magnifications by observing a sample placed on a Leitz hot stage in a nitrogen atmosphere. The polymer is optically anisotropic. Namely, it transmits a light when it is placed in between the crossed nicols. When the sample is optically anisotropic, the polarized light can be transmitted through it even in a still state.

The components of the polymer forming the above-mentioned anisotropic molten phase are as follows:
(1) One or more of aromatic and alicyclic dicarboxylic acids,
(2) one or more of aromatic, alicyclic, and aliphatic diols,
(3) one or more of aromatic hydroxycarboxylic acids,
(4) one or more of aromatic thiolcarboxylic acids,
(5) one or more of aromatic dithiols and aromatic thiolphenols, and
(6) one or more of aromatic hydroxyamines and aromatic diamines.

The polymers forming the anisotropic molten phase comprise the following combinations:
(I) a polyester comprising (1) and (2),
(II) a polyester comprising only (3),
(III) a polyester comprising (1), (2), and (3),
(IV) a polythiol ester comprising only (4),
(V) a polythiol ester comprising (1) and (5),
(VI) a polythiol ester comprising (1), (4), and (5),
(VII) a polyester amide comprising (1), (3), and (6), and
(VIII) a polyesteramide comprising (1), (2), (3), and (6).

In addition to the above-mentioned combinations of the components, the polymers forming the anisotropic molten phase include also aromatic polyazomethines such as poly(nitro-2-methyl-1,4-phenylenenitriloethylidine-1,4-phenylenethylidine), poly(nitrilo-2-methyl-1,4-phenylenenitrilomethylidine-1,4-phenylenemethylidine) and poly(nitrilo-2-chloro-1,4-phenylenenitrilomethylidine-1,4-phenylenemethylidine).

Further, in addition to the above-mentioned combinations of the components, the polymers forming the anisotropic molten phase include polyester carbonates essentially comprising 4-hydroxybenzoyl, dihydroxyphenyl, dihydroxycarbonyl, and terephthaloyl units.

Examples of the compounds constituting the above-mentioned polymers (I) to (VIII) include aromatic dicarboxylic acids such as terephthalic acid, 4,4'-diphenyldicarboxylic acid, 4,4'-triphenyldicarboxylic acid, 2,6-naphthalenedicarboxylic acid, diphenyl ether-4,4'-dicarboxylic acid, diphenoxyethane-4,4'-dicarboxylic acid, diphenoxybutane-4,4'-dicarboxylic acid, diphenylethane-4,4'-dicarboxylic acid, isophthalic acid, diphenyl ether-3,3'-dicarboxylic acid, diphenoxyethane-3,3'-dicarboxylic acid, diphenylethane-3,3'-dicarboxylic acid, and naphthalene-1,6-dicarboxylic acid; and those substituted with alkyl and alkoxy groups and halogen atoms, such as chloroterephthalic acid, dichloroterephthalic acid, bromoterephthalic acid, methylterephthalic acid, dimethylterephthalic acid, ethylterephthalic acid, methoxyterephthalic acid, and ethoxyterephthalic acid.

Examples of the alicyclic dicarboxylic acids include trans-1,4-cyclohexanedicarboxylic acid, cis-1,4-cyclohexanedicarboxylic acid, and 1,3-cyclohexanedicarboxylic acid as well as those substituted with alkyl and alkoxy groups and halogen atoms, such as trans-1,4-(1-methyl)cyclohexane dicarboxylic acid and trans-1,4-(1-chloro)cyclohexanedicarboxylic acid.

Examples of the aromatic diols include hydroquinone, resorcinol, 4,4'-dihydroxydiphenyl, 4,4'-dihydroxytriphenyl, 2,6-naphthalenediol, 4,4'-dihydroxydiphenyl ether, bis-(4-hydroxyphenoxy)ethane, 3,3'-dihydroxydiphenyl, 3,3'-dihydroxydiphenyl ether, 1,6-naphthalenediol, 2,2-bis(4-hydroxyphenyl)propane, and 2,2-bis(4-hydroxyphenyl)methane as well as those substituted with alkyl and alkoxy groups and halogen atoms, such as chlorohydroquinone, methylhydroquinone, 1-butylhydroquinone, phenylhydroquinone, methoxyhydroquinone, 1-butylhydroquinone, phenylhydroquinone, methoxyhydroquinone, phenoxyhydroquinone, 4-chlororesorcinol, and 4-methylresorcinol.

Examples of the alicyclic diols include trans-1,4-cyclohexanediol, cis-1,4-cyclohexanediol, trans-1,4-cyclohexanedimethanol, cis-1,4-cyclohexanedimethanol, trans-1,3-cyclohexanediol, cis-1,2-cyclohexanediol, and trans-1,3-cyclohexanedimethanol as well as those substituted with alkyl and alkoxy groups and halogen atoms, such as trans-1,4-(1-methyl)cyclohexanediol and trans-1,4-(1-chloro)cyclohexanediol.

Examples of the aliphatic diols include straight-chain or branched aliphatic diols such as ethylene glycol, 1,3-propanediol, 1,4-butanediol, and neopentyl glycol.

Examples of the aromatic hydroxycarboxylic acids include 4-hydroxybenzoic acid, 3-hydroxybenzoic acid, 6-hydroxy-2-naphthoic acid, and 6-hydroxy-1-naphthoic acid as well as those substituted with alkyl and alkoxy groups and halogen atoms, such as 3-methyl-4-hydroxybenzoic acid, 3,5-dimethyl-4-hydroxybenzoic acid, 2,6-dimethyl-4-hydroxybenzoic acid, 3-methoxy-4-hydroxybenzoic acid, 3,5-dimethoxy-4-hydroxybenzoic acid, 6-hydroxy-5-methyl-2-naphthoic acid, 6-hydroxy-5-methoxy-2-naphthoic acid, 3-chloro-4-hydroxybenzoic acid, 2-chloro-4-hydroxy-benzoic acid, 2,3-dichloro-4-hydroxybenzoic acid, 3,5-dichloro-4-hydroxybenzoic acid, 2,5-dichloro-4-hydroxybenzoic acid, 3-bromo-4-hydroxybenzoic acid, 6-hydroxy-5-chloro-2-naphthoic acid, 6-hydroxy-7-chloro-2-naphthoic acid, and 6-hydroxy-5,7-dichloro-2-naphthoic acid.

Examples of the aromatic mercaptocaroxylic acids include 4-mercaptobenzoic acid, 3-mercaptobenzoic acid, 6-mercapto-2-naphthoic acid, and 7-mercapto-2-naphthoic acid.

Examples of the aromatic dithiols include benzene-1,4-dithiol, benzene-1,3-dithiol, 2,6-naphthalenedithiol, and 2,7-naphthalenedithiol.

Examples of the aromatic mercaptophenols include 4-mercaptophenol, 3-mercaptophenol, 6-mercaptophenol, and 7-mercaptophenol.

Examples of the aromatic hydroxyamines and aromatic diamines include 4-aminophenol, N-methyl-4-aminophenol, 1,4-phenylenediamine, N-methyl-1,4-phenylenediamine, N,N'-dimethyl-1,4-phenylenediamine, 3-aminophenol, 3-methyl-4-aminophenol, 2-chloro-4-aminophenol, 4-amino-1-naphthol, 4-amino-4'-hydroxydiphenyl, 4-amino-4'-hydroxydiphenyl ether, 4-amino-4'-hydroxyphenylmethane, 4-amino-4'-hydroxydiphenyl sulfide, 4,4'-diaminophenyl sulfide (thiodianiline), 4,4'-diaminodiphenyl sulfone, 2,5-diaminotoluene, 4,4'-ethylenedianiline, 4,4'-diaminodiphenoxyethane, 4,4'-diaminodiphenylmethane (methylenedianiline), and 4,4'-diaminodiphenyl ether (oxydianiline).

The polymers (I) to (VIII) comprising the above-mentioned components may be divided into a group of those capable of forming the anisotropic molten phase and a group of those incapable of forming said phase according to the constituting components, polymers composition, and sequence distribution. The polymers used in the present invention are limited to those of the former group.

Among the polymers capable of forming the anisotropic molten phase suitably used in the present invention, the polyesters (I), (II), and (III), and polyesteramides (VIII) can be prepared by various ester forming processes wherein organic monomers each having a functional group which can form a desired recurring unit by the condensation are reacted with each other. The functional groups of these organic monomers include carboxyl, hydroxyl, ester, acryloxy, acyl halide, and amine groups. These organic monomers can be reacted by melt acidolysis in the absence of any heat exchange fluid. In this process, the monomers are heated to form a melt. As the reaction proceeds, the solid polymer particles are suspended in the melt. In the final stage of the condensation reaction, the reaction system may be evacuated to facilitate the removal of volatile by-products as acetic acid and water.

A slurry polymerization process may also be employed in the preparation of fully aromatic polyesters suitable for use in the present invention. In this process, the solid product is obtained in the form of suspension thereof in a heat exchange medium.

In either of said melt acidolysis and slurry polymerization processes, organic monomeric reactants from which fully aromatic polyesters can be derived may be employed in the reaction in a modified form obtained by esterifying the hydroxyl group of the monomer at ambient temperature (i.e., in the form of their lower acyl esters). The lower acyl groups have preferably about 2 to 4 carbon atoms. Preferably, acetates of the organic, monomeric reactants are employed in the reaction.

Typical examples of the catalysts usable in both of the melt acidolysis and slurry processes include dialkyltin oxides (such as dibutyltin oxide), dilauryltin oxide, titanium idoxide, titanium dioxide, antimony trioxide, alkoxytritanium silicates, titanium alkoxides, alkali metal and alkaline earth metal salts of carboxylic acids (such as zinc acetate), Lewis acids (such as BF$_3$), and gaseous acid catalysts such as hydrogen halides (e.g., HCl). The catalyst is used in an amount of generally about 0.001 to 1 wt%, particularly about 0.01 to 0.2 wt%, based on the monomer.

The fully aromatic polymers suitable for use in the present invention are substantially insoluble in ordinary solvents and, therefore, they are unsuitable for use in a solution processing process. However, as described above, these polymers can be processed easily by an ordinary melt processing process. Particularly preferred fully aromatic polymers are soluble in pentafluorophenol to some extent.

The fully aromatic polyester preferably used in the present invention have a weight-average molecular weight of generally about 2,000 to 200,000, preferably about 10,000 to 50,000, particularly about 20,000 to 25,000. The fully aromatic polyesteramides preferably used have a molecular weight of generally about 5,000 to 50,000, preferably about 10,000 to 30,000, for example, 15,000 to 17,000. The molecular weight may be determined by gel permeation chromatography or other standard methods in which no polymer solution is formed, such as a method in which terminal groups of a compression-molded film are determined by infrared spectroscopy. In another method, the molecular weight of the polymer may be determined according to a light-scattering method after it is dissolved in pentafluorophenol.

When the fully aromatic polyester or polyesteramide is dissolved in pentafluorophenol at 60° C. to obtain a 0.1 wt% solution thereof, the solution has generally an inherent viscosity (I.V.) of at least about 2.0 dl/g, for example, about 2.0 to 10.0 dl/g.

The anisotropic molten phase-forming polyesters used particularly preferably in the present invention are those containing at least about 10 molar % of a naphthalene moiety-containing recurring unit such as 6-hydroxy-2-naphthoyl, 2,6-dihydroxynaphthalene, and 2,6-dihydroxynaphthalene. Preferred polyesteramides are those having a recurring unit comprising the above-mentioned naphthalene moiety and 4-aminophenol or 1,4-phenylenediamine moiety. Examples of them will now be described.

(1) Polyesters essentially comprising the following recurring units I and II:

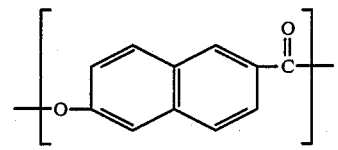

These polyesters comprise about 10 to 90 molar % of unit I and about 10 to 90 molar % of unit II. In one embodiment, unit II is contained in an amount of about 65 to 85 molar %, preferably about 70 to 80 molar % (for example, about 75 molar %). In another embodiment, unit II is contained in an amount of as small as about 15 to 35 molar %, preferably about 20 to 30 molar %. At least part of the hydrogen atoms bound directly to the ring may be replaced with a substituent selected from the group consisting of alkyl groups having 1 to 4 carbon atoms, alkoxy groups having 1 to 4 carbon atoms, halogen atoms, a phenyl group, substituted phenyl groups, and combinations of them.

(2) Polyesters essentially comprising the following recurring units I, II, and III:

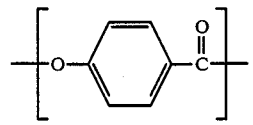

-continued

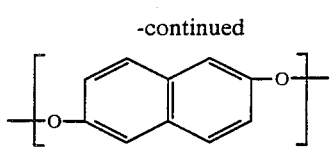

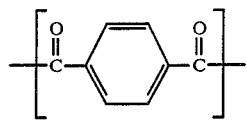

These polyesters contain about 30 to 70 molar % of unit I. They comprise preferably about 40 to 60 molar % of unit I, about 20 to 30 molar % of unit II, and about 20 to 30 molar % of unit III. At least part of the hydrogen atoms bound directly to the ring may be replaced with a substituent selected from the group consisting of alkyl groups having 1 to 4 carbon atoms, alkoxy groups having 1 to 4 carbon atoms, halogen atoms, a phenyl group, substituted phenyl groups, and combinations of them.

(3) Polyesters essentially comprising the following recurring units I, II, III, and IV.

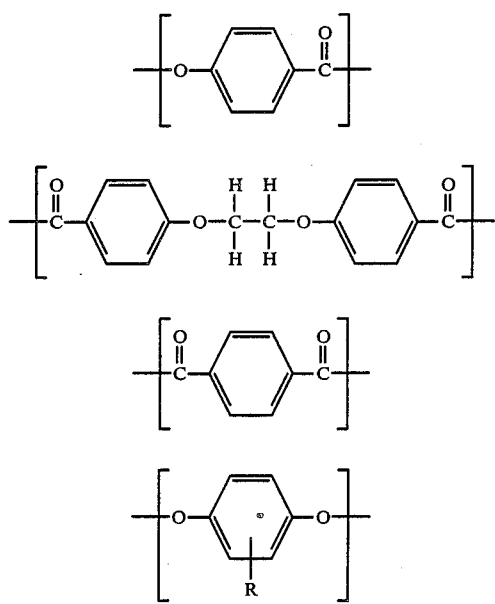

(wherein R represents a substituent for the hydrogen atom bound to the aromatic ring which is methyl, chlorine, bromine, or a combination of them.) These polyesters contain about 20 to 60 molar % of unit I, about 5 to 18 molar % of unit II, about 5 to 35 molar % of unit III, and about 20 to 40 molar % of unit IV. Preferably, they comprise about 35 to 45 molar % of unit I, about 10 to 15 molar % of unit II, about 15 to 25 molar % of unit III, and about 25 to 35 molar % of unit IV, with the proviso that the total molar concentration of units II and III is substantially equal to the molar concentration of unit IV. At least part of the hydrogen atoms bound directly to the ring may be replaced with a substituent selected from the group consisting of alkyl groups having 1 to 4 carbon atoms, alkoxy groups having 1 to 4 carbon atoms, halogen atoms, a phenyl group, substituted phenyl groups, and combinations of them. When the fully aromatic polyester is dissolved in pentafluorophenol at 60° C. to obtain a 0.3 w/v% solution thereof, the solution has generally an inherent viscosity of at least 2.0 dl/g, for example, 2.0 to 10.0 dl/g.

(4) Polyesters essentially comprising the following recurring units I, II, III, and IV:

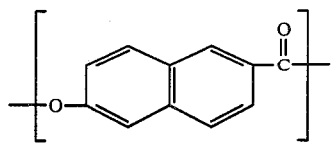

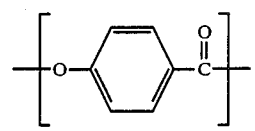

III. dioxyaryl units of the general formula: $-\{O-Ar-O\}-$ wherein Ar represents a divalent group having at least one aromatic ring, IV. dicarboxyaryl units of the general formula:

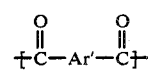

wherein Ar' represents a divalent group having at least one aromatic ring.

The amount of unit I is about 20 to 40 molar %. The amount of unit II is larger than 10 molar % but up to about 50 molar %. The amount of unit III is larger than 5 molar % but up to about 30 molar % and that of unit IV is larger than 5 molar % but up to 30 molar %. These polyesters comprise preferably about 20 to 30 molar % (for example, about 25 molar %) of unit I, about 25 to 40 molar % (for example, about 35 molar %) of unit II, about 15 to 25 molar % (for example, about 20 molar %) of unit III and about 15 to 25 molar % (for example, about 20 molar %) of unit IV. If necessary, at least part of the hydrogen atoms bound directly to the ring may be replaced with a substituent selected from the group consisting of alkyl groups having 1 to 4 carbon atoms, alkoxy groups having 1 to 4 carbon atoms, halogen atoms, a phenyl group, substituted phenyl groups, and combinations of them. The units III and IV are preferably symmetrical. More particularly, divalent bonds which connect the unit III or IV with adjacent units are arranged symmetrically on one or more aromatic rings (for example, when they are on a naphthalene ring, they are arranged in positions para to each other or on diagonal rings). However, assymetrical units derived from resorcinol and isophthalic acid may also be used.

A preferred dioxyaryl unit III is as follows:

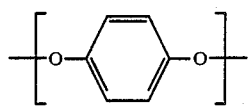

and a preferred dicarboxyaryl unit IV is as follows:

(5) Polyesters essentially comprising the following recurring units I, II, and III:

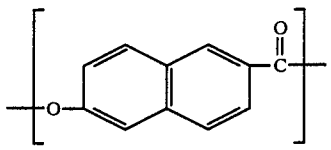
I.

II. dioxyaryl units of the general formula: ‒{O—Ar—O}‒ wherein Ar represents a divalent group having at least one aromatic ring, III. dicarboxyaryl units of the general formula:

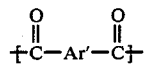

wherein Ar' represents a divalent group having at least one aromatic ring.

The amounts of units I, II, and III are about 10 to 90 molar %, 5 to 45 molar %, 5 to 45 molar %, and 5 to 45 molar %, respectively. These polyesters comprise preferably about 20 to 80 molar % of unit I, about 10 to 40 molar % of unit II, and about 10 to 40 molar % of unit III. More preferably, they comprise about 60 to 80 molar % of unit I, about 10 to 20 molar % of unit II, and about 10 to 20 molar % of unit III. If necessary, at least part of the hydrogen atoms bound directly to the ring may be replaced with a substituent selected from the group consisting of alkyl groups having 1 to 4 carbon atoms, alkoxy groups having 1 to 4 carbon atoms, halogen atoms, a phenyl group, substituted phenyl groups, and combinations of them.

A preferred dioxyaryl unit II is as follows:

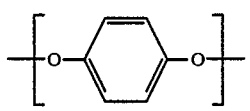

and a preferred dicarboxyaryl unit III is as follows:

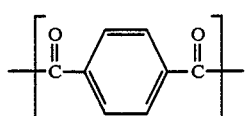

(6) Polyesteramides essentially comprising the following recurring units I, II, III, and IV:

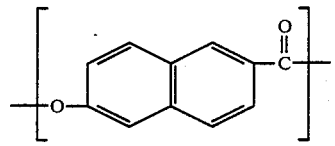
I.

II. units of the general formula:

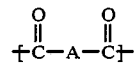

wherein A represents a divalent group having at least one aromatic ring or a divalent transcyclohexane group, III. units of the general formula: ‒{Y—Ar—Z}‒ wherein Ar represents a divalent group having at least one aromatic ring, Y represents O, NH or NR, and Z represents NH or NR, R being an alkyl group having 1 to 6 carbon atoms or an aryl group, IV. units of the general formula: ‒{O—Ar'—O}‒ wherein Ar' repesents a divalent group having at least one aromatic ring.

The amounts of units I, II, III, and IV are about 10 to 90 molar %, about 5 to 45 molar %, about 5 to 45 molar %, and about 0 to 40 molar %, respectively. If necessary, at least part of the hydrogen atoms bound directly to the ring may be replaced with a substituent selected from the group consisting of alkyl groups having 1 to 4 carbon atoms, alkoxy groups having 1 to 4 carbon atoms, halogen atoms, a phenyl group, substituted phenyl groups, and combinations of them.

A preferred dicarboxyaryl unit II is as follows:

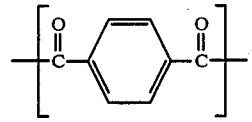

a preferred unit III is as follows:

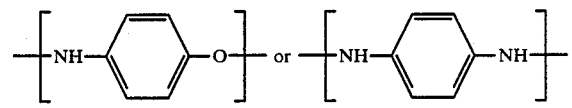

and a preferred dioxyaryl unit IV is as follows:

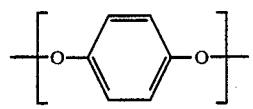

The anisotropic molten phase-forming polymers of the present invention include also those wherein part of a polymer chain comprises a segment of the above-mentioned anisotropic molten phase-forming polymer and the balance comprises a segment of a thermoplastic resin which does not form an anisotropic molten phase.

The melt-processable polymer composition to form the anisotropic molten phase which is used in this invention may contain one or more of (1) another polymer that forms the anisotropic molten phase, (2) a thermoplastic resin that does not form the anisotropic molten phase, (3) a thermosetting resin, (4) a low-molecular weight organic compound, and (5) an inorganic comound, in an amount which does not adversely affect the object of the invention. These additional components are not necessarily required to be miscible with the polymer to form the anisotropic molten phase.

Examples of the above-mentioned thermoplastic resin (2) include polyethylene, polypropylene, polybutylene, polybutadiene, polyisoprene, polyvinyl acetate, polyvinyl chloride, polyvinylidene chloride, polystyrene, acrylic resin, ABS resin, AS resin, BS resin, polyurethane, silicone resin, fluoroplastic, polyacetal, polycarbonate, polyethylene terephthalate, polybutylene terephthalate, aromatic polyester, polyamide, polyacrylonitrile, polyvinyl alcohol, polyvinyl ether, polyether imide, polyamide imide, polyether imide, polyether ketone, polyether sulfone, polysulfone, polyphenylene sulfide, and polyphenyleneoxide.

Examples of the above-mentioned thermosetting resin (3) include phenolic resin, epoxy resin, melamine resin, urea resin, unsaturated polyester resin, and alkyd resin.

Examples of the above-mentioned low-molecular weight organic compound (4) include those substances to be added to common thermoplastic resins and thermosetting resins. They include plasticizer, antioxidant, UV light absorber, antistatic agent, flame retardant, dye, pigment, foaming agent, crosslinking agent (e.g., divinyl compound and peroxide), lubricant, mold release, etc.

Examples of the above-mentioned inorganic compound (5) include those substances which are added to common thermoplastic resins and thermosetting resins, but have not electrical conductivity. They include glass fiber, rock wool, and other inorganic fibers of zirconia, alumina silica, potassium titanate, barium titanate, alumina, silica, and blast furnace slag; mineral fibers such as wollastonite and asbestos; whiskers of silicon carbide, boron nitride, silicon nitride, silicon oxidenitride, basic magnesium sulfate, and boron; synthetic fibers such as aramid fiber and phenolic resin fiber; and inorganic substance such as kaolin, calcined clay, talc, Canada mica, mica, vermiculite, calcium silicate, feldspar powder, acid clay, pyrophyllite clay, sericite, sillimanite, bentonite, glass flake, glass powder, glass beads, slate powder, calcium carbonate, chalk, barium carbonate, magnesium carbonate, dolomite, barite powder, blanc fixe, precipitated calcium sulfate, calcined gypsum, alumina hydrate, antimony oxide, magnesia, titanium oxide, zinc oxide, amorphous silica, flint quartz, silica sand, white carbon, and diatomaceous earth.

In practicing the present invention, the above-mentioned additives may be used in combination with another additive such as an oligomer which promotes the dispersion of carbon black. An oligomer is a low-molecular weight polymer which cannot be readily molded by itself. The one which is solid at normal temperature is desirable. It includes, for example, paraffin wax, microcrystalline wax, polyethylene wax, and polypropylene wax. Polyethylene wax may be obtained by the pyrolysis of high-molecular weight polyethylene resin produced by the high-pressure process, or by the direct polymerization of ethylene monomer. Polyethylene wax produced by pyrolysis at 300° C. or above disperses fillers better than polyethylene wax produced by the direct polymerization process, because the former has some branched chains and polar groups. Another example of known dispersing agent for carbon black is an oil. These dispersing agents may be used in combination with one another. These dispersing agents disperse carbon black, and consequently improves the thermal stability, moldability, and mechanical properties of the resulting electrically-conductive resin composition. The polyethylene wax should be added in an amount of 0.01 to 30 wt%, preferably 0.5 to 3 wt%, based on the resin composition.

The resin composition of this invention can be easily produced by any conventional method for producing filled resin compositions. According to one method, individual components are mixed, the resulting mixture is pelletized by extrusion, and the pellets are molded into a desired shape. According to another method, two or more kinds of pellets which differ in composition are mixed and the resulting mixed pellets are molded into a desired shape. According to further another method, individual components are fed directly to a molding machine.

The pelletization may be best achieved by the use of twin-screw extruder. In this case, it is desirable to premix the thermotropic liquid crystal polymer with electrically-conductive carbon black.

EXAMPLES

The invention is now illustrated with the following examples, which are not intended to restrict the scope of the invention.

EXAMPLE 1

Polymer A (mentioned later) which forms the anisotropic molten phase was mixed with electrically-conductive carbon black (Ketjen Black EC, a product of Lion Akzo Co., Ltd., the same shall apply hereinafter) in a ratio of 70 wt% to 30 wt%. The mixture was mixed and pelletized by using a twin-screw extruder. The pellets were injection-molded into test pieces for the measurement of flexural strength (ASTM D-790), Izod impact strength (ASTM D-256), and heat-distortion temperature (ASTM D-648). The electrical conductivity was evaluated by measuring the volume resistivity according to ASTM D-257.

EXAMPLE 2

The same experiment as in Example 1 was carried out, except that Polymer A was replaced by Polymer B (mentioned later).

EXAMPLE 3

The same experiment as in Example 1 was carried out, except that Polymer A was replaced by Polymer C (mentioned later).

EXAMPLE 4

The same experiment as in Example 1 was carried out, except that Polymer A was replaced by Polymer D (mentioned later).

EXAMPLES 5 TO 9

The same experiment as in Example 1 was carried out, except that Polymer A was replaced by Polymer C and the amount and kind of the resin and filler were changed as shown in Table 1.

The conditions of injection molding were properly adjusted in the range given below according to the type of resin and the type and amount of filler. Cylinder temperature: 280° to 350° C., mold temperature: 100° to 170° C., and injection pressure: 800 to 1500 kg/cm².

COMPARATIVE EXAMPLE 1

ABS resin wax mixed with the same electrically-conductive carbon black as used in Example 1, in a ratio of 70 wt% to 30 wt%. The mixture was unable to be mixed and extruded, and the measurements of physical properties were impossible to perform.

COMPARATIVE EXAMPLE 2

Polyamide resin (PAM) was mixed with the same electrically-conductive carbon black as used in Example 1, in a ratio of 70 wt% to 30 wt%. The mixture was unable to be mixed and extruded, and the measurements of physical properties were impossible to perform.

COMPARATIVE EXAMPLE 3

The same experiment as in Example 1 was carried out, except that Polymer A was replaced by Polymer C and the electrically-conductive carbon black was replaced by aluminum powder (30 wt%).

COMPARATIVE EXAMPLES 4 TO 7

The same experiments as in Examples were carried using Polymers A, B, C, ana D without the electrically-conductive carbon black.

The results of Examples 1 to 9 and Comparative Examples 1 to 7 are shown in Table 1.

The binder resins used in the examples are polymers A, B, C, and D each composed of the following constituting units.

provided with a stirrer, a nitrogen inlet tube, and a distillation tube. The mixture was heated to 260° C. in nitrogen stream and stirred violently at that temperature for 2.5 h and then at 280° C. for 3 h while acetic acid was distilled off from the reactor. The temperature was elevated to 320° C. and nitrogen introduction was stopped. The pressure in the reactor was reduced gradually to 0.1 mmHg after 15 min. The mixture was stirred at that temperature under that pressure for 1 h.

The obtained polymer had an intrinsic viscosity of 5.0 as determined in pentafluorophenol at a concentration of 0.1 wt% at 60° C.

<Resin B>

1081 parts of 4-acetoxybenzoic acid, 489 parts of 2,6-diacetoxynaphthalene, and 332 parts of terephthalic acid were fed to a reactor provided with a stirrer, a nitrogen inlet tube, and a distillation tube. The mixture was heated to 250° C. in nitrogen stream and stirred violently at that temperature for 2 h and then at 280° C. for 2.5 h while acetic acid was distilled off from the reactor. The temperature was elevated to 320° C. and the nitrogen introduction was stopped. The pressure in the reaction was reduced gradually to 0.2 mmHg after 30 min. The mixture was stirred at that temperature under that pressure for 1.5 h.

The obtained polymer had an intrinsic viscosity of 2.5 as determined in pentafluorophenol at a concentration of 0.1 wt% at 60° C.

<Resin C>

1261 parts of 4-acetoxybenzoic acid and 691 parts of

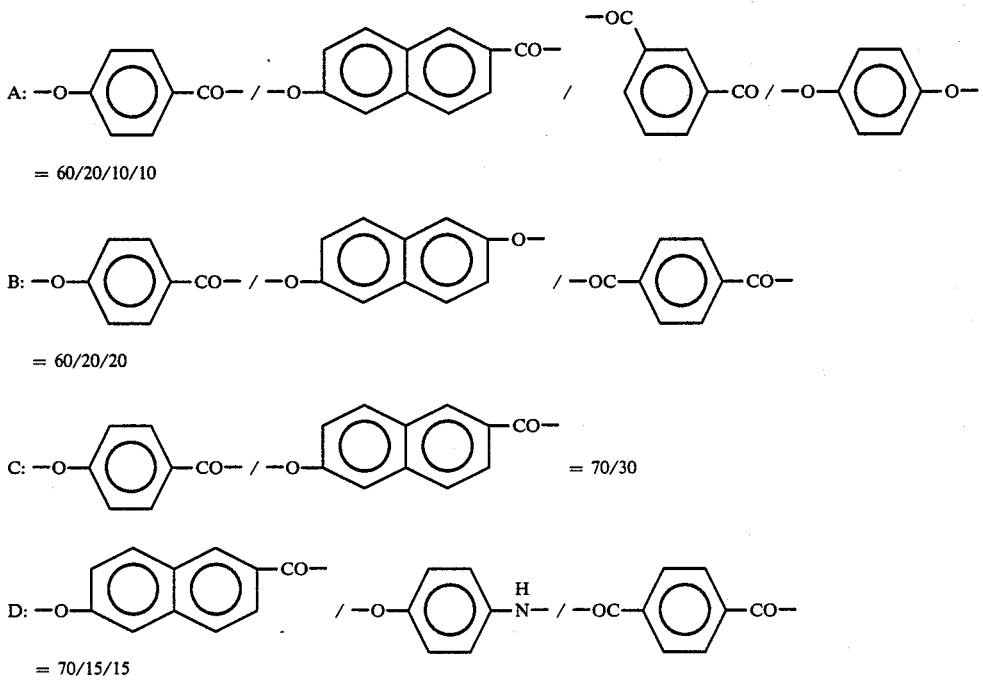

The above-mentioned resins A, B, C, and D are produced in the following manner.

<Resin A>

1081 parts (by weight, the same shall apply hereinafter) of 4-acetoxybenzoic acid, 460 parts of 6-acetoxy-2-naphthoic acid, 166 parts of isophthalic acid, and 194 parts of 1,4-diacetoxybenzene were fed to a reactor 6-acetoxy-2-naphthoic acid were placed in a reactor provided with a stirrer, a nitrogen inlet tube, and a distillation tube. The mixture was heated to 250° C. in nitrogen stream and stirred violently at that temperature for 3 h and then at 280° C. for 2 h while acetic acid was distilled off from the reactor. The temperature was elevated to 320° C. and the nitrogen introduced was stopped. The pressure in the reactor was reduced gradually to 0.1 mmHg after 20 min. The mixture was stirred at that temperature under that pressure for 1 h.

The obtained polymer had an intrinsic viscosity of 5.4 as determined in pentafluorophenol at a concentration of 0.1 wt% at 60° C.

<Resin D>

1612 parts of 6-acetoxy-2-naphthoic acid, 290 parts of 4-acetoxyacetanilide, 249 parts of terephthalic acid, and 0.4 parts of sodium acetate were placed in a reactor provided with a stirrer, a nitrogen inlet tube, and a distillation tube. The mixture was heated to 250° C. in nitrogen stream and stirred violently at that temperature for 1 h and then at 300° C. for 3 h while acetic acid was distilled off from the reactor. The temperature was elevated to 340° C. and the nitrogen introduction was stopped. The pressure in the reactor was reduced gradually to 0.2 mmHg after 30 min. The mixture was stirred at that temperature under that pressure for 30 min.

The obtained polymer had an intrinsic viscosity of 3.9 as determined in pentafluorophenol at a concentration of 0.1 wt% at 60° C.

conductive carbon black, and its molded product is superior in electrical conductivity and impact strength.

The embodiments of the invention in which an exclusive property or privilege is claimed are defined as follows:

1. An electrically conductive resin composition having superior moldability and electrical conductivity characteristics which comprises (1) a melt-processable polymer which is capable of forming an anisotropic melt phase and (2) an electrically conductive carbon black.

2. A composition having superior moldability and electrical conductivity characteristics as claimed in claim 1, which comprises (1) 25 to 99.5 percent by weight of said melt-processable polymer which is capable of forming an anisotropic melt phase and (2) 0.5 to 75 percent by weight of said carbon black.

3. A composition having superior moldability and electrical conductivity characteristics as claimed in claim 1, in which said melt-processable polymer which is capable of forming an anisotropic melt phase contains repeating ester groups.

4. A composition having superior moldability and electrical conductivity characteristics as claimed in claim 1, which further comprises (3) up to 40 percent by weight of another electrically conductive filler.

5. A composition having superior moldability and electrical conductivity characteristics as claimed in

TABLE 1

| Example | Composition Resin (wt %) | Filler (wt %) | Volume resistivity ($\Omega \cdot cm$) | Specific gravity | Flexural strength (kg/cm$^2$) | Impact strength (kg $\cdot$ cm/cm) | Heat distortion temp. (°C.) |
|---|---|---|---|---|---|---|---|
| 1 | A (70) | KBEC (30) | $10^{-2}$ | 1.42 | 1620 | 6.2 | 200 |
| 2 | B (70) | KBEC (30) | $10^{-2}$ | 1.41 | 1620 | 6.0 | 190 |
| 3 | C (70) | KBEC (30) | $10^{-2}$ | 1.40 | 1610 | 6.0 | 190 |
| 4 | D (70) | KBEC (30) | $10^{-2}$ | 1.44 | 2140 | 6.3 | 200 |
| 5 | C (95) | KBEC (5) | $10^{1}$ | 1.40 | 1700 | 23 | 185 |
| 6 | C (65) | KBEC (30) | $10^{-2}$ | 1.41 | 1630 | 7.0 | 190 |
| 7 | C (70) | CF (20) KBEC (10) | $10^{-2}$ | 1.46 | 2120 | 8.0 | 220 |
| 8 | C (70) | Al powder (20) KBEC (10) | $10^{-2}$ | 1.66 | 1615 | 6.0 | 190 |
| 9 | C (99) | KBEC (1) | $10^{2}$ | 1.40 | 1710 | 24 | 188 |
| 1* | ABS (70) | KBEC (30) | ** | — | — | — | — |
| 2* | PAM (70) | KBEC (30) | ** | — | — | — | — |
| 3* | C (70) | Al powder (30) | $10^{0}$ | 1.79 | 1620 | 6.0 | 190 |
| 4* | A (100) | — | $10^{16}$ | 1.42 | 1735 | 43 | 190 |
| 5* | B (100) | — | $10^{16}$ | 1.41 | 1730 | 42 | 180 |
| 6* | C (100) | — | $10^{16}$ | 1.40 | 1720 | 44 | 180 |
| 7* | D (100) | — | $10^{16}$ | 1.44 | 2590 | 44 | 195 |

*Comparative Examples
**Impossible to mix and extrude.
KBEC: Ketjen Black EC
CF: Carbon fiber As Table 1 apparently shows, the electrically-conductive resin composition of this invention is suitable for plastics housing parts in computers and electronics machines. It can contain a large amount of electrically-claim 1, which further comprises (3) up to 30 percent by weight of an electrically conductive filler in the form of fibers.

6. A composition having superior moldability and electrical conductivity characteristics as claimed in claim 1, 4 or 5, which further comprises (4) 0.01 to 30 percent by weight of a polyolefin wax.

7. A composition having superior moldability and electrical conductivity characteristics as claimed in claim 1, which comprises (1) 65 to 98 percent by weight of said melt-processable polymer and (2) 2 to 35 percent by weight of said carbon black.

8. A composition having superior moldability and electrical conductivity characteristics as claimed in claim 1 wherein said melt-processable polymer which is capable of forming an anisotropic melt phase contains more than approximately 10 mole percent of naphthalene units.

9. A composition having superior moldability and electrical conductivity characteristics as claimed in claim 8 wherein said naphthalene units of said melt-processable polymer which is capable of forming an anisotropic melt phase are selected from the group consisting of 6-hydroxy-2-naphthoyl, 2,6-dioxynaphthalene, and 2,6-dicarboxynaphthalene.

10. A composition having superior moldability and electrical conductivity characteristics as claimed in claim 1 wherein said melt-processable polymer which is capable of forming an anisotropic melt phase exhibits an inherent viscosity of at least about 2.0 dl./g. when dissolved in a concentration of 0.1 percent by weight in pentafluorophenol at 60° C.

11. A composition having superior moldability and electrical conductivity characteristics as claimed in claim 1 wherein said melt-processable polymer which is capable of forming an anisotropic melt phase exhibits an inherent viscosity of approximately 2.0 to 10.0 dl./g. when dissolved in a concentration of 0.1 percent weight in pentafluorophenol at 60° C.

12. A composition having superior moldability and electrical conductivity characteristics as claimed in claim 1 wherein said melt-processable polymer which is capable of forming an anisotropic melt phase in a polyester which consists essentially of the recuring moieties I and II which may include substitution of at least some of the hydrogen atoms present upon an aromatic ring wherein:

I is

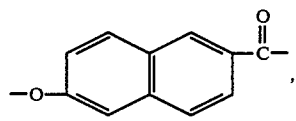

and
II is

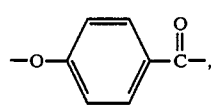

with said optional substitution if present being selected from the group consisting of an alkyl group of 1 to 4 carbon atoms, an alkoxy group of 1 to 4 carbon atoms, halogen, phenyl, substituted phenyl, and mixtures of the foregoing, and wherein said polyester comprises approximately 10 to 90 mole percent of moiety I, and approximately 10 to 90 mole percent of moiety II.

13. A composition having superior moldability and electrical conductivity characteristics as claimed in claim 1 wherein said melt-processable polymer which is capable of forming an anisotropic melt phase is a polyester which consists essentially of recurring moieties I, II and III where:

I is

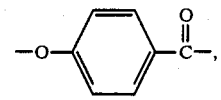

II is

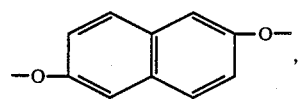

and
III is

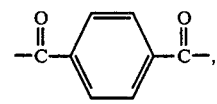

wherein at least some of the hydrogen atoms present upon the aromatic rings optionally may be replaced by substitution selected from the group consisting of an alkyl group of 1 to 4 carbon atoms, an alkoxy group of 1 to 4 carbon atoms, halogen, phenyl, substituted phenyl, and mixtures of the foregoing, and wherein said polyester comprises about 30 to 70 mole percent of moiety I.

14. A composition having superior moldability and electrical conductivity characteristics as claimed in claim 13 wherein moiety I is present in a concentration of about 40 to 60 mole percent, moiety II is present in a concentration of about 20 to 30 mole percent, and moiety III is present in a concentration of about 20 to 30 mole percent.

15. A composition having superior moldability and electrical conductivity characteristics as claimed in claim 1 wherein said melt-processable polymer which is capable of forming an anisotropic melt phase is a polyester which consists essentially of the recurring moieties I, II, III and IV wherein:

I is

II is

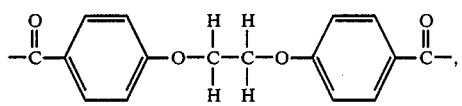

III is

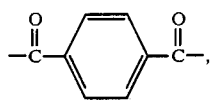

and
IV is

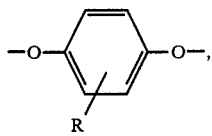

where R is methyl, chloro, bromo, and mixtures thereof, and is substituted for a hydrogen atom present upon the aromatic ring, and wherein the polyester comprises about 20 to 60 mole percent of moiety I, about 5 to 18 mole percent of moiety II, and about 5 to 35 mole percent of moiety III, and about 20 to 40 mole percent of moiety IV.

16. A composition having superior moldability and electrical conductivity characteristics as claimed in claim 15 wherein moiety I is present in a concentration of about 35 to 45 mole percent, moiety II is present in a concentration of about 10 to 15 mole percent, moiety III is present in a concentration of about 15 to 25 mole percent, and moiety IV is present in a concentration of about 25 to 35 mole percent.

17. A composition having superior moldability and electrical conductivity characteristics as claimed in claim 1 wherein said melt-processable polymer which is capable of forming an anisotropic melt phase is a polyester which consists essentially of moieties I, II, III and IV which may include substitution of at least some of the hydrogen atoms present upon an aromatic ring wherein:
I is

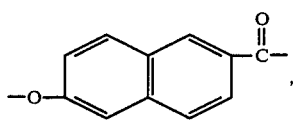

II is

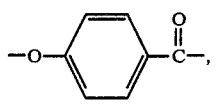

III is a dioxyaryl moiety of the formula —O—Ar—O— where Ar is a divalent radical comprising at least one aromatic ring, and
IV is a dicarboxyaryl moiety of the formula

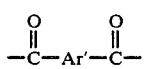

where Ar' is a divalent radical comprising at least one aromatic ring,
with said optional substitution if present being selected from the group consisting of an alkyl group of 1 to 4 carbon atoms, and alkoxy group of 1 to 4 carbon atoms, halogen, phenyl, substituted phenyl, and mixtures of the foregoing, and wherein said polyester comprises about 20 to 40 mole percent of moiety I, in excess of 10 mole percent but less than about 50 mole percent of moiety II, in excess of 5 mole percent but less than about 30 mole percent of moiety III, and in excess of 5 mole percent but less than 30 mole percent of moiety IV.

18. A composition having superior moldability and electrical conductivity characteristics as claimed in claim 17 wherein moiety I is present in a concentration of about 20 to 30 mole percent, moiety II is present in a concentration of about 25 to 40 mole percent, moiety III is present in a concentration of about 15 to 25 mole percent, and moiety IV is present in a concentration of about 15 to 25 mole percent.

19. A composition having superior moldability and electrical conductivity characteristics as claimed in claim 1 wherein said melt-processable polymer which is capable of forming an anisotropic melt phase is a polyester which consists essentially of recurring moieties I, II, and III which may include substitution of at least some of the hydrogen atoms present upon an aromatic ring wherein:
I is

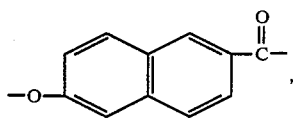

II is a dioxyaryl moiety of the formula —O—Ar—O— wherein Ar is a divalent radical comprising at least one aromatic ring, and
III is a dicarboxyaryl moiety of the formula

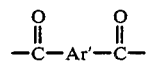

wherein Ar' is a divalent radical comprising at least one aromatic ring,
with said optional substitution if present being selected from the group consisting of an alkyl group of 1 to 4 carbon atoms, an alkoxy group of 1 to 4 carbon atoms, halogen, phenyl, substituted phenyl, and mixtures of the foregoing, and wherein said polyester comprises about 10 to 90 mole percent of moiety I, about 5 to 45 mole percent of moiety II, and about 5 to 45 mole percent of moiety III.

20. A composition having superior moldability and electrical conductivity characteristics as claimed in claim 19 wherein moiety I is present in a concentration of about 20 to 80 mole percent, moiety II is present in a concentration of about 10 to 40 mole percent, and moiety II is present in a concentration of about 10 to 40 mole percent.

21. A composition having superior moldability and electrical conductivity characteristics as claimed in claim 1 wherein said melt-processable polymer which is capable of forming an anisotropic melt phase is a poly(esteramide) which consists essentially of recurring moieties I, II, and III, and optional IV, wherein:
I is II is

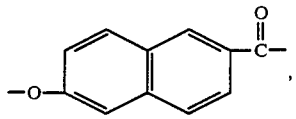

wherein A is a divalent radical comprising at least one aromatic ring or a divalent transcyclohexane radical, III is —Y—Ar—Z where Ar is a divalent radical comprising at least one aromatic ring, Y is O, NH, or NR, and Z is NH or NR, wherein R is an alkyl group having 1 to 6 carbon atoms or an aryl group, and IV is —O—Ar'—O— where Ar' is a divalent radical comprising at least one aromatic ring, wherein at least some of the hydrogen atoms present upon the aromatic rings optionally may be replaced by substitution selected from the group consisting of an alkyl group of 1 to 4 carbon atoms, an alkoxy group of 1 to 4 carbon atoms, halogen, phenyl, substituted phenyl, and mixtures of the foregoing, and wherein said poly(ester-amide) comprises about 10 to 90 mole percent of moiety I, about 5 to 45 mole percent of moiety II, about 5 to 45 mole percent of moiety III, and about 0 to 40 mole percent of moiety IV.

* * * * *